United States Patent Office 3,202,597
Patented Aug. 24, 1965

3,202,597
IRRADIATION POLYMERIZATION OF COM-
PRESSED PARTICULATE TRIOXANE
Carroll F. Doyle, Ellicott City, and Harry C. Helm-
linger, Jr., Baltimore, Md., assignors to W. R. Grace &
Co., New York, N.Y., a corporation of Connecticut
No Drawing. Filed June 24, 1963, Ser. No. 290,251
5 Claims. (Cl. 204—154)

The present invention relates to the irradiation polymerization of trioxane, and more specifically to an improved method for preparing a finely divided highly fibrous polyoxymethylene which possesses numerous commercially valuable properties.

Trioxane when first subjected to high energy ionizing irradiation in the solid state may subsequently be polymerized at a temperature of from about 30 to 61° C. to obtain a highly fibrous polyoxymethylene polymer. To obtain maximum yields of polymer the trioxane is preferably formed into a solid plaque by melting and solidifying prior to irradiation. The resulting highly fibrous polymer may be ground or milled by conventional means to obtain a particulate material having a major dimension of less than 50 microns and a length to diameter ratio of greater than about 10:1. This finely divided fibrous material finds numerous uses such as thickening agents for organic liquids, suspending agents, insecticides, and so forth.

The effectiveness of irradiation produced polyoxymethylene for the above uses depends largely on complete size reduction through adequate milling. It is found that the prior treatment or physical state of the trioxane monomer prior to irradiation has a profound effect on the millibility of the resultant polymer.

For example, it is frequently found that polyoxymethylene which has been prepared by prior art methods which involve irradiation of trioxane which has been melted and cooled to form a solid plaque before irradiation is difficult to mill. This prior polymerization technique while producing satisfactory results with respect to attaining high percent conversion to polymer and high molecular weight, frequently produces irratic and generally unsatisfactory results when it comes to producing a polyoxymethylene which is suitable for milling purposes. On the other hand, if particulate trioxane is irradiated and polymerized, poor results from the standpoint of yield are generally obtained.

It is therefore an object of the present invention to provide a novel improved method for obtaining good yields of finely divided fibrous polyoxymethylene polymer which finds wide application as thickeners, insecticides, suspending agents, and so forth.

It is another object to provide a method by which trioxane may be treated so as to yield a readily millable polyoxymethylene polymer upon polymerization with high energy ionizing irradiation.

These and still further objects of the present invention will become readily apparent to one skilled in the art from the following detailed description and specific examples.

Broadly, the present invention contemplates a method for preparing finely divided fibrous polyoxymethylene which involves firstly compressing particulate trioxane under a pressure of at least 500 p.s.i. to obtain a coherent trioxene sheet having a thickness of from about 0.2 to about 1.0 cm., then polymerizing the sheet using high energy ionizing irradiation as the polymerization initiator, and finally grinding the polymerized sheet to obtain a finely divided polyoxymethylene polymer, the fibers of which preferably have a major dimension of less than about 50 microns and a length to diameter ratio of greater than about 10:1.

More specifically, we have found that if ordinary commercially available particulate trioxane is first compressed under a pressure of at least 500 lbs./sq. inch and preferably 1000 to 10,000 p.s.i. to form a coherent sheet, and then polymerized using high energy ionizing irradiation as the initiating means in the normal manner, a fibrous polyoxymethylene is obtained in good yield which is much more adaptable to milling than polyoxymethylene obtained by the irradiation polymerization techniques heretofore disclosed in the prior art.

The trioxane used in the practice of the present invention may be of the ordinary commercial grade which contains below about 0.02% by weight moisture. This commercially available trioxane may consist of trioxane particles falling within practically any particle size range. Generally commercially available trioxane particles range from about 10 mesh down to about 60 mesh U.S. in size.

The particulate trioxane is compressed into the sheets used in the present invention by the application of mechanical pressure. It is found that satisfactory sheets may be obtained when pressures in excess of about 500 p.s.i. are used. These sheets are cohesive in nature and have sufficient mechanical strength so as to maintain the physical shape into which they have been pressed. Ordinarily it is desired to obtain a sheet which ranges in thickness of from about 0.4 to about 1.0 centimeter. Sheets of this thickness may be easily and thoroughly irradiated using conventional irradiation techniques.

The present trioxane sheets are conveniently prepared by pressing the particulate trioxane in a suitable die using a hydraulic press or mechanical screw press of sufficient size and strength to deliver a minimum of 500 lbs./sq. inch force on the trioxane being compressed. The size of the sheets which are formed and the pressure to which they are subjected are limited only by the mechanical capacity of dies and presses used. Pressures in the order of 100,000 to 200,000 p.s.i. may be used if available.

Subsequent to formation of the trioxane sheets the monomer is subjected to high energy ionizing irradiation which creates activated polymerization sites therein. Ionizing irradiations which may be used in the practice of the present invention are high energy electrons, protons, alpha particles, deuterons, and neutrons. Furthermore, irradiations produced from radioactive isotopes or an atomic pile including X-rays and gamma rays may be used.

The amount of high energy ionizing irradiation used during the irradiation step may vary between 0.01 and 10 megarads. From a practical standpoint, however, irradiation dosages in the range of from about 0.02 to about 1.0 megarad are normally used in that they are easily obtained from commercially available irradiation apparatus and do not cause undue heating of the crystalline trioxane monomer.

The irradiation may be affectively delivered at room temperature or any temperature up to about 60° C. It is generally preferred that the irradiation dosage be delivered to the trioxane while the trioxane maintained in the vessel which is sealed to the atmosphere. Trioxane possesses a considerable vapor pressure at room temperature and above, and unless the processing steps are carried out in sealed containers considerable loss of trioxane by evaporation will result.

Subsequent to irradiation the irradiated polymer is held at a temperature above about 30° C. and preferably within a temperature range from about 55 to 61° C. (which is a temperature range just below the melting point of the trioxane monomer) to permit polymerization to take place. To minimize the possibility of oxidation occurring at the polymerization sites of the irradiated monomer, the irradiation and polymerization of the trioxane may be carried out in an inert atmosphere which may be provided by an inert gas while the monomer is maintained in a suitable sealed container. It is also found, however, that generally satisfactory results may be obtained by carrying out the process in air. The polymerization of the trioxane at the above temperature range is continued for a period of from about 0.5 about 10 hours. Within this polymerization time it is found that polyoxmethylene yields in the order of 50% may be readily obtained.

Subsequent to polymerization, the non-polymerized trioxane may be removed from the polymerization product by extracting the polymerization mass with a solvent for the non-polymerized trioxane such as water, methanol, and acetone. Alternatively, the trioxane may be removed by evaporating the trioxane from the reaction mass at room temperature or elevated temperature with or without the application of reduced pressure. Removal of the trioxane by evaporation, permits the non-polymerized trioxane to be collected and recycled into the process without intermediate drying or other purification steps.

The polymers obtained by the present invention possess a unique fibrous structure. When the fibers are examined by conventional X-ray diffraction techniques it is found the polymers posses a repeating identity period of 14 A. along the fiber axis. The melting point for the polymers range from about 185 to 200° C. The reduced specific visocities (RSV) which indicate molecular weight of the polymers determined at 135° C. using 0.1 gram of polymer per 100 milliliters of gamma butyrolactone vary from about 0.3 to about 3.0 deciliters per gram.

Subsequent to removal of the non-reactant trioxane, the polymer obtained is subjected to a grinding process wherein the polymer is reduced to a size which provides particles having a major dimension of less than about 50 microns and a length to diameter ratio of greater than about 10:1. This grinding step may be carried out in any conventional manner using conventional apparatus such as high speed rotary cutting or shearing devices, wet grinding machines and fluid energy mills. It is found, however, that the present polymers are most effectively disintegrated by means of the last mentioned fluid energy mill devices. Due to the highly fibrous nature of the present polyoxymethylene polymers, it is found that the high speed impact and grinding action which occurs in a conventional fluid energy mill is particularly effective in segregating the fibers and breaking them into the desired particle size. These particles when reduced to particle size range indicated above, find numerous commercial applications, among them being thickening agents, suspending agents, and additives for other finely divided particulate materials such as silica and pigments.

Having described the present invention the following specific examples are given to illustrate embodiments thereof.

*Example I*

Commercial particulate trioxane was pressed into sheets having a thickness from about 0.5 to 0.65 centimeters. These sheets measured approximately 10 x 8 inches and were formed by subjecting the particulate trioxane to a pressure of 2,000 lbs./sq. inch in a hydraulic press. The pressed sheets were subjected to a radiation dosage of 0.5 megarad at room temperature. The dosage comprised 2 mev. electrons as produced by a Van de Graaff accelerator. The irradiated trioxane sheets were then broken up into pieces having sizes ranging from ½ to 2 inches and loaded into an aluminum tube. The ends of the tube were sealed and the tube was placed in a water bath held at 55° C. for 5 hours. Subsequently, the tube was removed and the contents leached with water until it was free of non-polymerized trioxane. The extracted polymer was then dried at 75 to 90° F. From an initial charge of 1,110 grams of trioxane, 472 grams of dried polymer representing a 42.5% conversion was obtained.

The polymer obtained was then ground in a conventional fluid energy mill to obtain a product which comprises particles having a major dimension of less than 50 microns and a length to diameter ratio of at least 10:1 and subsequently tested as a thickening agent for a conventional polyester resin to determine its thickening efficiency. (In general, the thickening efficiency is a measure of the degree of desired particle size reduction.) The results are tabulated in the table below.

| Grinding rate (g./min.): | Viscosity (cps.) |
|---|---|
| 10 | 24,000 |
| 20 | 20,200 |
| 30 | 16,000 |

In the above table it is seen that three grinding rates are used. The faster grinding rate produces a lesser degree of particle reduction and therefore the thickening properties of the polyoxymethylene are less than the more finely divided material which has been passed through the fluid energy mill at a slower rate. The above viscosity readings were taken using a conventional Brookfield device using a number 4 spindle. The polyoxymethylene material was added to the polyester at a concentration of 1 part polyoxymethylene to 100 parts polyester resin.

*Example II*

To compare the effectiveness of the procedure set forth in Example I with the conventional prior art procedure of forming a plaque of trioxane by melting and resolidificaton, this example repeats the procedure set forth in Example I using a plaque or trioxane prepared by melting and cooling commercially available particulate trioxane. 850 grams of trixone crystals was placed in an aluminum pan measuring 1 x 10 x 15 inches. The pan was covered with a ¼ inch aluminum plate and then heated to 140° C. for 15 minutes. This heating completely melted the trioxane. The pan was then permitted to cool at room temperature for 1 hour whereupon the trioxane solidified. The solid plaque thus formed was removed from the pan, and then irradiated and polymerized by the same procedure set forth in Example I. The product weighted 420 grams which represented 51.3% conversion.

The product was then milled in the same apparatus used in Example I. It is found that the fluid energy mill plugged up numerous times even at feed rates as low as 10 grams per minute. This was apparently due to the very poor millibility of trioxane obtained by the conventional melt polymerization method. A portion which was finally ground at a rate of 10 grams per minute showed the following thickening properties when used in the same polyester resin used in Example I at a concentration of one part polyoxymethylene per 100 parts of resin.

| Grinding rate (g./min.): | Viscosity (cps.) |
|---|---|
| 10 | 9,000 |
| 20 | 7,400 |
| 30 | 2,000 |

As seen from the above data the material obtained in this example which uses melt polymerization has much less thickening efficiencies than that obtained by the method set forth in the present invention.

The above specific examples clearly indicate that the method of preparing finely divided polyoxymethylene set forth in the present invention provides an improved and more efficient means for obtaining a finely divided material which possesses valuable thickening properties.

We claim:
1. A method for preparing finely divided fibrous polyoxymethylene which comprises compressing particulate trioxane under a pressure in excess of about 500 lbs./sq. inch to form a self-sustaining cohesive sheet of trioxane particles, irradiating said sheet in the solid state with high energy ionizing irradiation to form active polymerization sites therein, heating said irradiated sheet to a temperature of from about 30 to 61° C. to cause polymerization, separating non-polymerized trioxane from polyoxymethylene which is formed, and grinding said polyoxymethylene to obtain finely divided polyoxymethylene fibers having a major dimension of less than 50 microns and a length diameter of the ratio greater than 10:1.

2. The method of claim 1 wherein said trioxane sheet has the thickness of from 0.4 to about 1.0 centimeter.

3. The method of claim 2 wherein from about 0.01 to about 10 megarads of irradiation are delivered to said trioxane.

4. The method of claim 1 wherein said irradiated sheet is heated for from about 0.5 to about 10 hours.

5. The method of claim 4 wherein the non-polymerized trioxane is removed by extraction with water.

No references cited.

MURRAY TILLMAN, *Primary Examiner.*